UNITED STATES PATENT OFFICE.

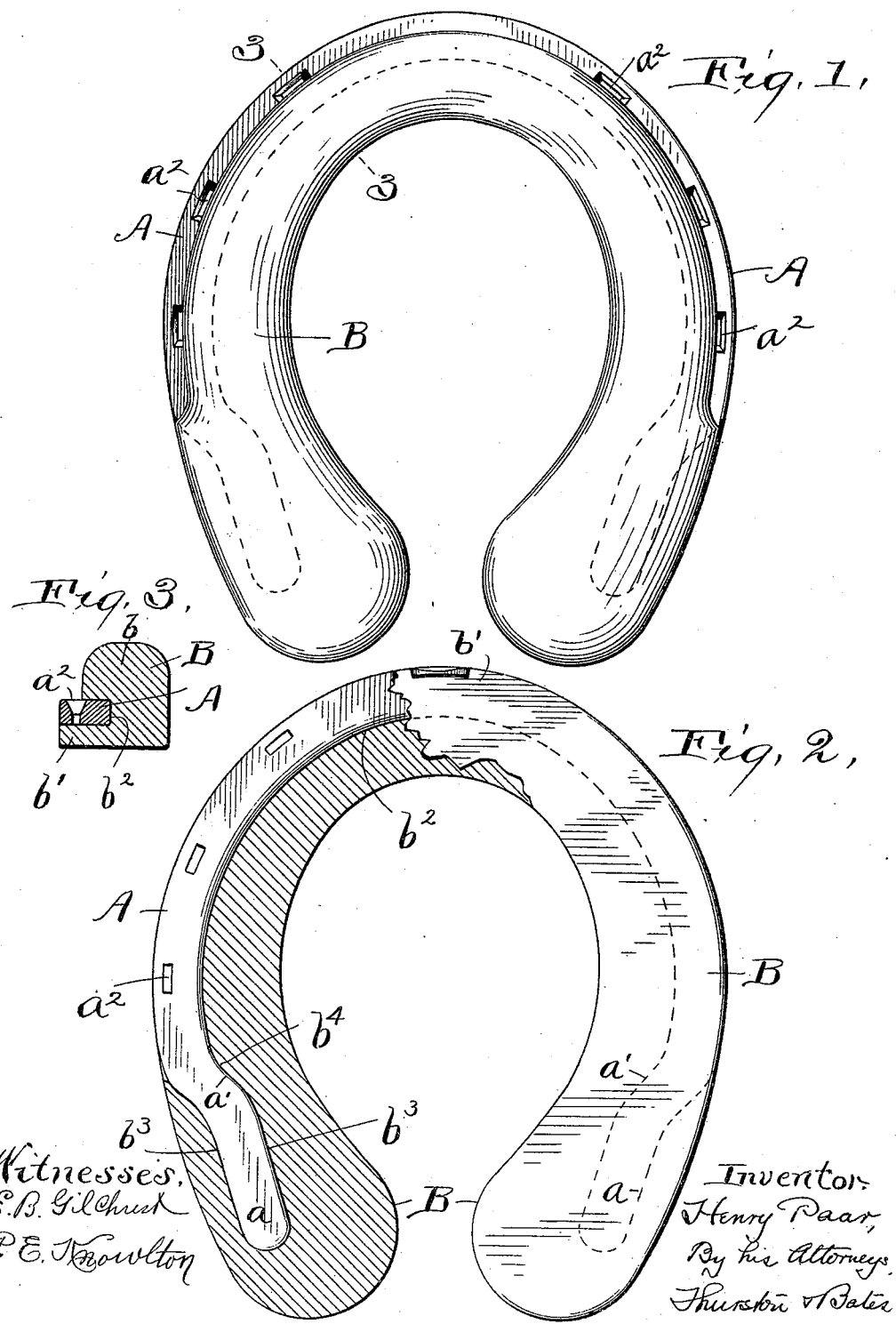

HENRY PAAR, OF CANTON, OHIO, ASSIGNOR, BY MESNE ASSIGNMENTS, TO THE PAAR DOUBLE CUSHION HORSE-SHOE COMPANY, OF SAME PLACE.

RUBBER-CUSHION HORSESHOE.

SPECIFICATION forming part of Letters Patent No. 646,234, dated March 27, 1900.

Application filed December 30, 1899. Serial No. 742,053. (No model.)

*To all whom it may concern:*

Be it known that I, HENRY PAAR, a citizen of the United States, residing at Canton, in the county of Stark and State of Ohio, have invented a certain new and useful Improvement in Horseshoes, of which the following is a full, clear, and exact description, reference being had to the accompanying drawings.

The invention relates to an improvement in rubber-cushion horseshoes; and the invention consists in the construction and combination of parts hereinafter described, and pointed out definitely in the claim.

In the drawings, Figure 1 is a bottom plan view of my improved horseshoe. Fig. 2 is a top plan view of the same, partly in horizontal section. Fig. 3 is a vertical sectional view on the line 3 3 of Fig. 1.

The horseshoe consists of two parts—namely, the metal frame A and the rubber cushion B. The metal frame is a metal strip having, preferably, plane parallel top and bottom surfaces, which strip is bent in the direction of its greatest width into substantially horseshoe form. Its rear ends $a$ are, however, bent inward and then rearward, thereby forming the shoulders $a'$. The rubber cushion is also of substantially horseshoe form. It has a tread portion $b$, which when the parts are assembled extends inside of the frame A and down some little distance—say half an inch—below the lower surface of said frame. It has also an outwardly-extended flange $b'$ on the upper edge of its outer periphery, which flange does not, however, extend to the rear ends of the shoe, but is merged into the tread part of said cushion, the ends of which extend outward under the frame into line with the flange. In the outer periphery of the cushion just below this flange is a groove $b^2$, which receives the inner edge of the frame A. This groove at both ends connects with horizontal recesses $b^3$ in the enlarged ends of the cushion, which recesses are curved inward and then rearward, thereby forming the shoulders $b^4$. When the parts are assembled, the frame projects in the groove $b^2$, and the flange $b'$ is at its outer edge flush with the outer edge of the frame. The bent ends $a$ of the frame are forced into the recesses $b^3$, the flexible ends of the cushion yielding inward to permit this. When these ends are in place in these recesses, the shoulders $a'$ and $b^4$ engage, and thereby act to prevent the cushion from being moved rearward out of the embrace of the frame. The nails to fasten the shoe to the horse's hoof pass through holes $a^2$ in the frame and through the flange $b'$ of the cushion, which is immediately above said holes.

Having described my invention, I claim—

In a horseshoe, the combination of a horseshoe-shaped metal frame having its rear ends bent inward and then rearward to form shoulders, with an elastic cushion having a downwardly-extended tread portion, an outwardly-extended flange, an external groove below the flange, and recesses in the ends of the cushion connecting with the ends of the groove, which recesses are curved inwardly and then rearwardly to form shoulders, substantially as and for the purpose specified.

In testimony whereof I hereunto affix my signature in the presence of two witnesses.

HENRY PAAR.

Witnesses:
 CHAS. SEEMANN,
 MAZIE BOLUS.